July 26, 1932.   H. V. MAY   1,869,341
WELDING TORCH
Filed May 27, 1931

Inventor:
Harold V. May
by Charles V. Mueller
His Attorney

Patented July 26, 1932

1,869,341

UNITED STATES PATENT OFFICE

HAROLD V. MAY, OF PITTSFIELD, MASSACHUSETTS, ASSIGNOR TO GENERAL ELECTRIC COMPANY, A CORPORATION OF NEW YORK

WELDING TORCH

Application filed May 27, 1931. Serial No. 540,393.

My invention relates to welding, and more particularly to an improved welding torch for gas-arc welding. In gas-arc welding the welding operation is performed through the agency of an electric arc and a gaseous medium supplied to and about the arc.

My invention is particularly applicable to the utilization of the heating effects of flames of atomic hydrogen. An atomic hydrogen flame may be produced by dissociating hydrogen through the agency of an electric arc and then allowing the dissociated hydrogen to recombine or "burn". Upon recombination the atomic hydrogen liberates an enormous amount of heat which may be used for welding or like operations. The utilization of such atomic hydrogen flames is disclosed and claimed broadly in the copending application of Irving Langmuir, Serial No. 729,185, filed July 30, 1924, for heating process and apparatus, which application is assigned to the same assignee as the present application. While my invention is well suited for atomic hydrogen flame welding, many of the features of construction thereof are of general application to the type of welding apparatus wherein an arc is maintained between a plurality of electrodes supported adjacent the work, and is especially applicable to such types of welding apparatus wherein a welding medium of any suitable character is supplied to and about the arc and the work being welded.

It is an object of my invention to provide an improved feeding mechanism and an improved arc striking mechanism for arc welding torches of the class above described.

Figure 1:
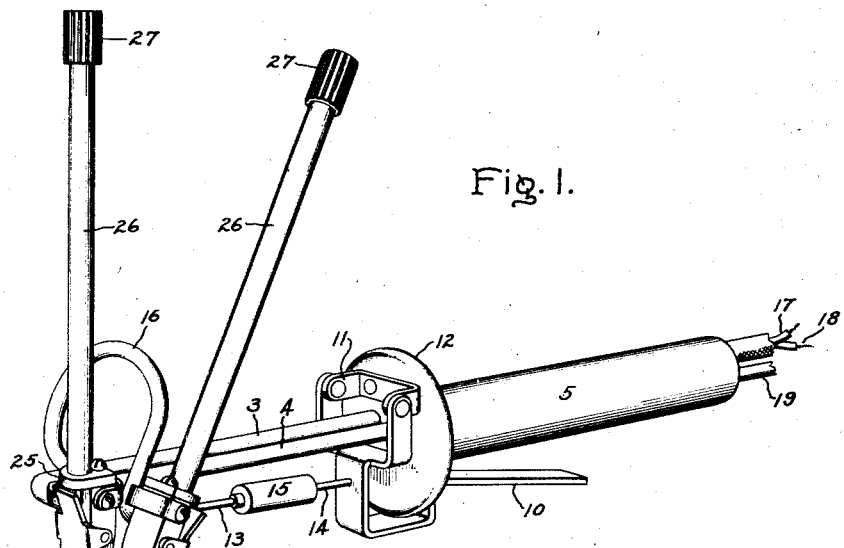
Figure 2:
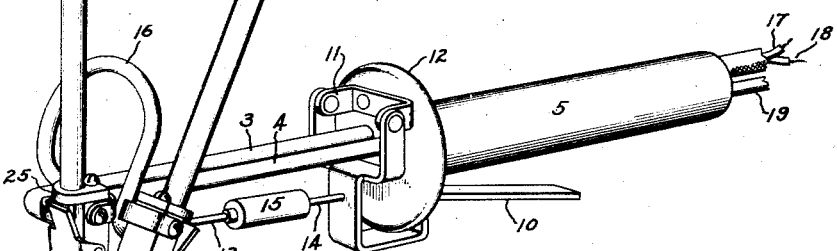
Figure 3:
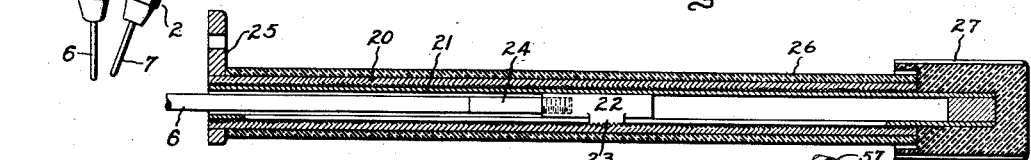
Figure 4:
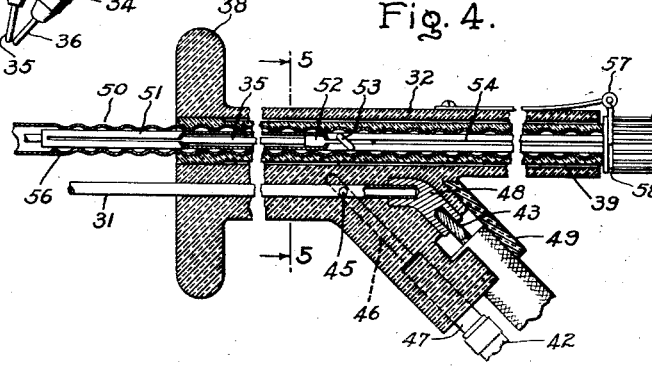
Figure 5:
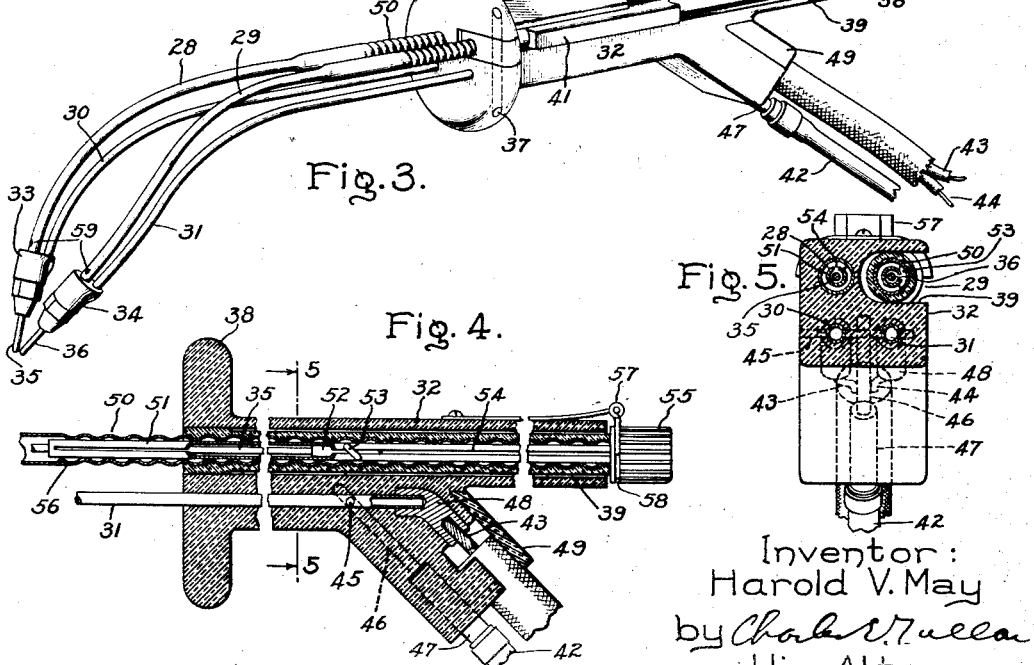

My invention will be better understood from the following description taken in connection with the accompanying drawing, in which Fig. 1 is a perspective view of a gas-arc welding torch embodying my invention; Fig. 2 is a sectional view of the feeding mechanism of the torch shown in Fig. 1; Fig. 3 is a perspective view of another form of gas-arc welding torch embodying my invention; Fig. 4 is a longitudinal section view of the handle portion of the torch shown in Fig. 3, and Fig. 5 is a sectional view of the handle of the torch of Fig. 3 taken along the line 5—5 of Fig. 4.

The torch shown in Fig. 1 comprises a plurality of electrode holders 1 and 2 independently supported by tubes 3 and 4 which project from a handle 5. Electrodes 6 and 7 are fed through these electrode holders by means of feeding mechanism supported thereon. By means of a lever 10 pivoted to a bracket 11 on guard 12 of handle 5 which is connected through rods 13 and 14 and insulating member 15 to electrode holder 2, this holder may be given a limited movement for moving electrode 7 relatively to electrode 6 to strike and control the welding arc established between these electrodes during welding. This limited movement is made possible by providing tube 4 with a bent portion 16 which is sufficiently resilient for this purpose and which also acts as a spring member which tends to hold the electrodes in a given position relative to one another. Electricity is supplied to electrode holders 1 and 2 through tubes 3 and 4 by means of electrical conductors 17 and 18 and gas is supplied to these tubes by a pipe 19. The electrode holders 1 and 2 are so constructed that they constitute means for frictionally engaging and conducting electric current into the ends of electrodes 6 and 7 protruding through them and for supplying gas along the electrodes and across an arc established between their arcing terminals. The particular construction of the electrode holders illustrated in the drawing is described and claimed in Letters Patent No. 1,808,541, Robert T. Gillette and Edward S. Webster, dated June 2, 1931.

The feeding mechanisms are alike, and their construction is shown in the sectional view of Fig. 2. Each mechanism comprises an internally threaded tube 20 which encloses a sleeve 21 rotatably supported therein. This sleeve 21 is provided with a longitudinal keyway in which is located an electrode holding member 22 having a threaded projection 23 extending through the keyway into engagement with the threaded surface of the tube 20. The electrode 6 in the particular case illustrated is of tungsten and is provided with a threaded terminal 24 of iron which is screwed into a threaded opening in the electrode holder 22. The tube 20 is mounted in a bracket 25 by means of which it is attached to the electrode holders or other means provided for frictionally engaging and conducting electric current into the protruding end of the electrode. Tube 20 is insulated by a covering of insulating material 26, and sleeve 21 is provided with a knob 27 of insulating material by means of which it may be rotated relatively to the tube 20. When sleeve 21 is rotated relatively to tube 20, electrode holder 22 is caused to revolve and by reason of the engagement of its threaded surface 23 with the threaded surface of the tube 20 is fed in one direction or the other along the tube 20 depending upon the direction of rotation imparted to it.

The torch shown in Fig. 3 is particularly adapted for feeding flexible electrodes, although the mechanical construction of the torch is equally applicable to torches designed for feeding non-flexible electrodes. The torch shown comprises a plurality of electrode tubes 28 and 29 and a plurality of gas tubes 30 and 31 having downwardly and inwardly curved portions projecting beyond a handle 32 and terminating in nozzle members 33 and 34. Flexible electrodes 35 and 36 are fed through the electrode tubes and nozzles into arcing engagement with one another by means of feeding mechanisms enclosed partly or wholly within the handle of the torch. In the particular torch illustrated the electrode tube 28 and gas tubes 30 and 31 are supported in and extend longitudinally through the handle 32. Electrode tube 29, however, is pivotally supported at 37 in the guard 38 of the handle so that that portion of tube 29 corresponding to the portion of the tube 28 enclosed within the handle 32 is located in a groove 39 extending longitudinally of the handle. The electrode tubes are biased relatively to one another to a predetermined position by a spring 40 located in this slot. The portion of the tube 29 within the groove 39 is insulated and provided with a hand-piece 41 by means of which it may be moved about the pivot 37 under the action of the spring 40.

Gas is supplied to gas tubes 30 and 31 through handle 32 by a hose or like conduit 42 and electricity is supplied to these tubes by conductors 43 and 44. The connections by means of which this is accomplished are shown in the sectional views of Figs. 4 and 5. As shown in Fig. 5 gas tubes 30 and 31 are supported in but insulated from one another by the insulating material of the handle 32. The tubes are connected by a transverse passageway 45 which in turn is connected by a passageway 46 and a pipe 47 to the hose 42 referred to above. In the particular torch illustrated the passageways 45 and 46 and the seat for the tube 47 are obtained by drilling holes in the insulating material of handle 32. It is of course possible to obtain the same result by molding these passageways in the handle at the time of fabricating the torch. By resorting to the construction just described gas tubes 30 and 31 are electrically insulated from one another and from the supply pipe 47. The electrical connection between conductors 43 and 44 and the gas tubes 30 and 31 is obtained through caps 48 which close the ends of tubes 30 and 31 forming terminals for conductors 43 and 44. This connection is made within the body of the handle within a chamber covered by a detachable cap 49. The particular construction just described forms part of the subject matter and is claimed in Letters Patent No. 1,808,541, Robert T. Gillette and Edward S. Webster, dated June 2, 1931.

In the torch shown in Fig. 3 the feeding mechanism is located in the electrode tubes. This feeding mechanism is essentially the same as that described above in connection with Figs. 1 and 2. The portion 50 of the electrode tubes 28 and 29 in the handle of the torch is internally threaded and within this threaded portion is enclosed a sleeve member 51 into which the electrode extends, and from which it is propelled by a member 52 having a threaded portion 53 extending through a keyway 54 in the sleeve into engagement with the threaded portion 50 of the electrode tube. The sleeve 51 is rotatable relatively to the electrode tube and is provided at its terminal with a knob 55 by means of which rotation is obtained. The knob is preferably made of insulating material although other means may be provided for electrically insulating the sleeve 51 from the operator thereby protecting him against shock. When the sleeve 51 is rotated by turning the knob 55 the electrode is propelled through the electrode tube by member 52 which is propelled along the sleeve by reason of the engagement of its threaded portion 53 with the threaded portion 50 of the electrode tube. It will be noted, however, that the electrode tube is provided with an enlarged portion 56 into which the terminal portion of the sleeve 51 projects the arrangement being such that when the threaded portion 53 of member 52 is propelled into this enlarged portion further feeding of the electrode is prevented by disengagement of the threaded portion 53 of the propelling member from the threaded portion 50 of the electrode tube. By employing this construction it is impossible to jam the feeding mechanism since threaded portion 53 of the propelling member 52 will merely rotate idly therein when fed into this enlarged portion. In order to prevent the sleeves 51 from being accidentally withdrawn or pushed by reactionary forces from the electrode tube, it is held in place by a latch 57 attached to the handle of the torch and engaging a circumferential groove 58 in the knob 55. By providing this construction it is possible to turn the knob 55 to feed the electrode, while at the same time holding the knob and its sleeve 51 in place relatively to the handle of the torch. The portion of the latch 58 which engages the knob 55 attached to the pivotally supported electrode tube is cut away sufficiently to permit free pivotal movement of this tube.

Each of the electrode tubes 28 and 29 is provided with vent holes 59 shown in Fig. 3. These vent holes are provided for preventing gas supplied through nozzles 33 and 34 from flowing back through the electrode tubes into or through the feeding mechanisms located therein. If the gas is corrosive in character, it will impair or destroy the feeding mechanism, or if it is inflammable, on escaping from the ends of the electrode tubes, may become ignited and burn with a small flame directly under the operator's hand. The vent holes 59 prevent both of these occurrences. These vent holes should be made large enough to carry away any gas leaking back through the nozzles 33 and 34 into the electrode tubes 28 and 29. Preferably these vents are located near the nozzles as shown in the torch illustrated in Fig. 3.

The particular form of torch shown in Fig. 3, and the vent holes referred to in the preceding paragraph have been described and claimed in the copending application of Harry W. Tobey, Serial No. 540,394, filed concurrently herewith for welding torch, and assigned to the same assignee as the present application.

Modifications of my invention will occur to those skilled in the art in view of the arrangements above described, and I therefore aim in the appended claims to cover all such modifications as fall within the true spirit and scope of my invention, as set forth in the appended claims.

What I claim as new and desire to secure by Letters Patent of the United States, is:—

1. An arc welding torch comprising a plurality of curved convergent electrode tubes, means for pivoting one of said tubes for movement relative to another of said tubes, means for feeding electrodes through said tubes into arcing engagement with one another, means for connecting a source of electricity to each of said tubes, means constituting a handle for said torch for electrically insulating adjacent portions of said tubes, and means for biasing said tubes relative to one another to a predetermined position.

2. An arc welding torch comprising a handle, an electrode tube supported in and extending longitudinally through said handle, a longitudinal groove in said handle, a second tube extending through said groove, means for pivotally supporting said second tube relatively to said first-mentioned tube, and means for biasing said tubes relatively to one another to a predetermined position.

3. An arc welding torch comprising a handle, an electrode tube supported in and extending longitudinally through said handle, a longitudinal groove in said handle, a second tube extending through said groove, a guard for said handle, means for pivotally supporting said second tube in said guard for movement relative to said first-mentioned tube, and means for biasing said tubes relatively to one another to a predetermined position.

4. An arc welding torch comprising a handle, a plurality of tubes extending through said handle having downwardly and inwardly curved portions extending beyond said handle, nozzle members at the terminal portions of said tubes, means for conducting electricity into said nozzles, means for pivotally supporting said tubes relatively to one another, a longitudinal groove in said handle through which one of said tubes extends, means for electrically insulating that portion of said tube in said groove, and means in said handle for biasing said tube out of said groove, and the nozzle supported by said tube toward the nozzle supported by said other tubes.

5. An electrode holder comprising an internally threaded tube, a rotatable sleeve having a keyway extending longitudinally thereof in said tube, an electrode holding member in said keyway having a screw member engaging the threads of said tube, means for frictionally engaging and conducting electric current into the protruding end of an electrode held within said tube, and means for relatively rotating said tube and said sleeve to feed said electrode through said last-mentioned means.

6. An electrode holder comprising an internally threaded tube, a rotatable sleeve having a keyway extending longitudinally thereof in said tube, an electrode holding member in said keyway having a screw member engaging the threads of said tube, means attached to said sleeve and extending beyond said tube for rotating said sleeve relatively to said tube, and means for frictionally engaging and conducting electric current into the protruding end of an electrode held within said tube and said sleeve.

7. An electrode holder comprising an internally threaded tube, means for insulating the external surface of said tube, a rotatable sleeve having a keyway extending longitudinally thereof in said tube, an electrode holding member in said keyway having a screw member engaging the threads of said tube, a cap member attached to but electrically insulated from said tube for closing one end of said tube, and means at the other end of said tube for frictionally engaging and conducting electric current into the protruding end of an electrode held within said tube.

8. An electrode holder comprising a friction clamp, means for conducting electric current into said clamp, an internally threaded tube mounted on said clamp, a rotatable sleeve having a keyway extending longitudinally thereof in said tube, an electrode holding member in said keyway having a screw member engaging the threads of said tube, and means attached to said sleeve and extending out of said tube for rotating said sleeve relatively to said tube to feed an electrode through said clamp.

9. An arc welding torch comprising a handle, a tube having an internally threaded portion extending longitudinally through said handle, an electrode containing a portion projecting beyond said handle and an enlarged portion intermediate said portions, a rotatable sleeve having a keyway extending through said threaded portion into said enlarged portion, an electrode propelling member in said keyway having a screw member engaging the threads of said tube and freely rotatable in said enlarged portion, means for frictionally engaging and conducting electric current into an electrode supported in said electrode tube, and means for relatively rotating said tube and said sleeve to propel said electrode through said tube.

In witness whereof I have hereunto set my hand.

HAROLD V. MAY.